(12) United States Patent
Lee et al.

(10) Patent No.: US 8,277,132 B2
(45) Date of Patent: Oct. 2, 2012

(54) BIDIRECTIONAL OPTICAL TRANSCEIVER MODULE

(75) Inventors: Jong-jin Lee, Gwangju-si (KR); Hyun-seo Kang, Gwangju-si (KR); Jai-sang Koh, Gwangju-si (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 274 days.

(21) Appl. No.: 12/607,730

(22) Filed: Oct. 28, 2009

(65) Prior Publication Data

US 2011/0052125 A1    Mar. 3, 2011

(30) Foreign Application Priority Data

Aug. 25, 2009 (KR) .................. 10-2009-0078819

(51) Int. Cl.
*G02B 6/36* (2006.01)
(52) U.S. Cl. .............. 385/92; 385/88; 385/93
(58) Field of Classification Search .......... 385/31, 385/33, 39, 49, 53, 58, 88–94
See application file for complete search history.

(56) References Cited

U.S. PATENT DOCUMENTS

| | | | | |
|---|---|---|---|---|
| 4,047,796 A * | 9/1977 | Kao et al. | ......... | 385/70 |
| 4,123,139 A * | 10/1978 | Sandahl | ......... | 385/64 |
| 4,217,029 A * | 8/1980 | Kao | ......... | 385/64 |
| 4,378,145 A * | 3/1983 | Stancati et al. | ......... | 385/64 |
| 4,575,182 A * | 3/1986 | Hensel et al. | ......... | 385/64 |
| 5,166,993 A * | 11/1992 | Blyler et al. | ......... | 385/31 |
| 7,142,740 B2 | 11/2006 | Lee et al. | | |
| 7,203,391 B2 | 4/2007 | Uekawa et al. | | |
| 7,325,985 B2 * | 2/2008 | Takagi | ......... | 385/94 |
| 7,463,659 B2 * | 12/2008 | Go et al. | ......... | 372/36 |
| 2003/0161593 A1 * | 8/2003 | Stackhouse | ......... | 385/92 |
| 2005/0089280 A1 * | 4/2005 | Kumar et al. | ......... | 385/88 |
| 2005/0180755 A1 * | 8/2005 | Masahiko | ......... | 398/135 |
| 2006/0088271 A1 * | 4/2006 | Ghoshal | ......... | 385/147 |
| 2007/0098335 A1 * | 5/2007 | Baek et al. | ......... | 385/93 |
| 2010/0303418 A1 * | 12/2010 | Wang | ......... | 385/64 |

* cited by examiner

*Primary Examiner* — Ellen Kim
(74) *Attorney, Agent, or Firm* — Staas & Halsey LLP

(57) ABSTRACT

A bidirectional optical transceiver module with a temperature control function is provided. The bidirectional optical transceiver module includes a package configured to have a flat bottom surface and include two windows used for optical transmission and reception; a ferrule configured to be coupled to one side of the package and allow an optical fiber to be inserted therein; an optical receiver module configured to be coupled to another side of the package in a direction perpendicular to that of the ferrule coupled to the package; a sub-optical transmitter module configured to be built in the package and include a light-emitting element and a collimating lens used to collimate light from the light-emitting element; an optical filter configured to be built in the package, transmit light from the light-emitting element to the optical fiber and reflect light received through the optical fiber to the optical receiver module; and a temperature regulator configured to be built in the package and control the sub-optical transmitter module to a preset temperature. Accordingly, it is possible to reduce the manufacturing cost of the package, effectively discharge heat, and be more endurable to external impact or vibration.

13 Claims, 5 Drawing Sheets

BIDIRECTIONAL OPTICAL TRANSCEIVER MODULE

CROSS REFERENCE TO RELATED APPLICATION

This application claims the benefit under 35 U.S.C. §119(a) of Korean Patent Application No. 10-2009-78819, filed on Aug. 25, 2009, the disclosure of which is incorporated by reference in its entirety for all purposes.

BACKGROUND

1. Field

The following description relates to a bidirectional optical transceiver module, and more particularly, to a bidirectional optical transceiver module with a temperature control function.

2. Description of the Related Art

Passive optical network (PON)-based bidirectional optical transceiver modules have recently been manufactured with a single-fiber type bidirectional optical subassembly (BOSA) instead of with a dual-fiber type BOSA to reduce the optical fiber installation cost or line rental fee.

FIG. 1 illustrates a bidirectional optical transceiver module according to a related art. Referring to FIG. 1, the bidirectional optical transceiver module 10 includes a TO-Can type optical transmitter module 21 and a TO-Can type optical receiver module 31 which are arranged with respect to an optical filter 41.

The optical transmitter module 21 and the optical receiver module 31 are arranged and fixed to a housing 51 by a laser welder. The optical filter 41 is provided in the housing 51. The optical filter 41 transmits light from the optical transmitter module 21 to an optical fiber 62 inserted into a ferrule 61, and reflects light, which is input through the optical fiber 62, to the optical receiver module 31. The optical transmitter module 21 is equipped with a laser diode and a collimating lens 24 which are built in a TO-Can package 22. The optical receiver module 31 is equipped with a photodiode 33 and a focusing lens 34 which are built in a TO-Can package 32.

For an electro-absorptive laser (EML) for high-speed (e.g., 10 Gbps or more) long-distance transmission or a wavelength division multiplexing (WDM) which lays stress on stable wavelengths, the optical transmitter module 21 requires temperature control. For this purpose, the optical transmitter module 21 may be equipped with a cooler for temperature control. In this case, the optical transmitter module 21 is securely fixed to a heat sink or an optical transceiver case to radiate heat from the cooler.

In this case, the housing 51 and the optical receiver module 31 are not fixed to the heat sink or the optical transceiver case but are hung on the optical transmitter module 21. This may cause a coupled portion between the optical transmitter module 21 and the housing 51 or between the housing 51 and the optical receiver module 31 to be vulnerable to external impact or vibration. Accordingly, in considering processes such as optical alignment and laser welding, the conventional bidirectional optical transceiver module disadvantageously grows large and complicated.

SUMMARY

Accordingly, in one aspect, there is provided a bidirectional optical transceiver module including a package configured to have a flat bottom surface and include two windows used for optical transmission and reception; a ferrule configured to be coupled to one side of the package and allow an optical fiber to be inserted therein; an optical receiver module configured to be coupled to another side of the package in a direction perpendicular to that of the ferrule coupled to the package; a sub-optical transmitter module configured to be built in the package and include a light-emitting element and a collimating lens used to collimate light from the light-emitting element; an optical filter configured to be built in the package, transmit light from the light-emitting element to the optical fiber and reflect light received through the optical fiber to the optical receiver module; and a temperature regulator configured to be built in the package and control the sub-optical transmitter module to a preset temperature.

The bidirectional optical transceiver module does not need an existing housing and a holder to support the optical transmitter module. Accordingly, it is possible to reduce the manufacturing cost of the package, effectively discharge heat from the temperature regulator, and be more endurable to external impact or vibration.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
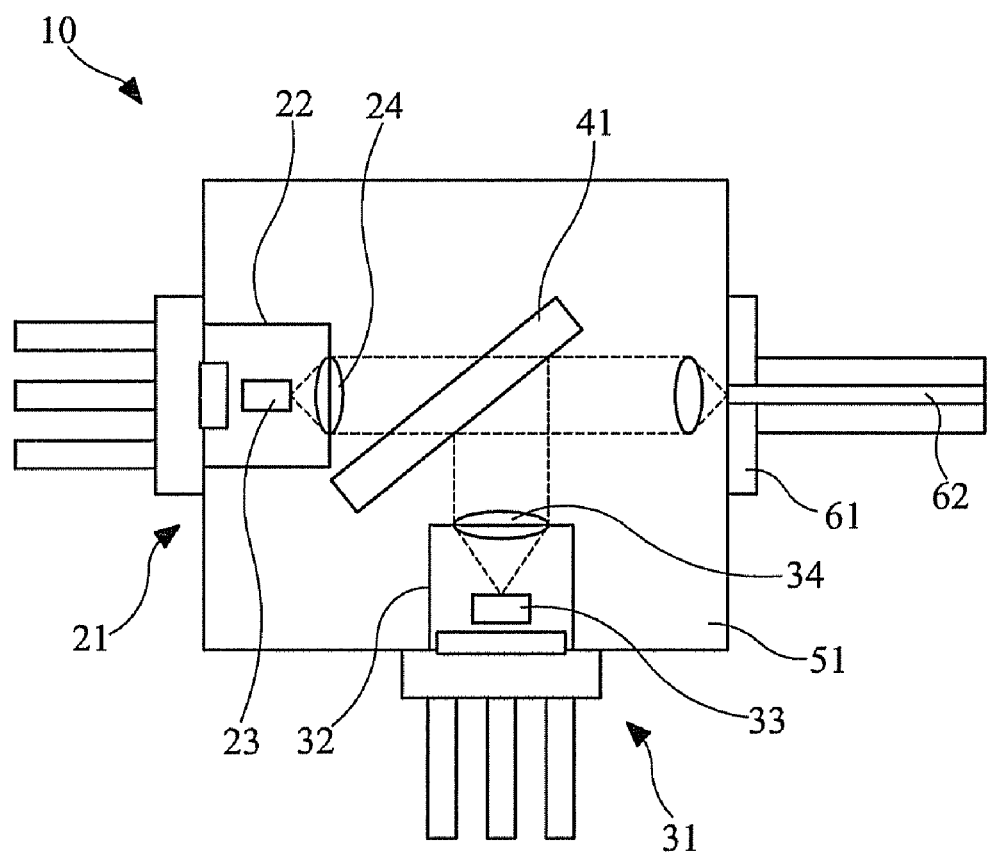
FIG. 1 is a cross-sectional view of a bidirectional optical transceiver module according to the related art.
Figure 2:
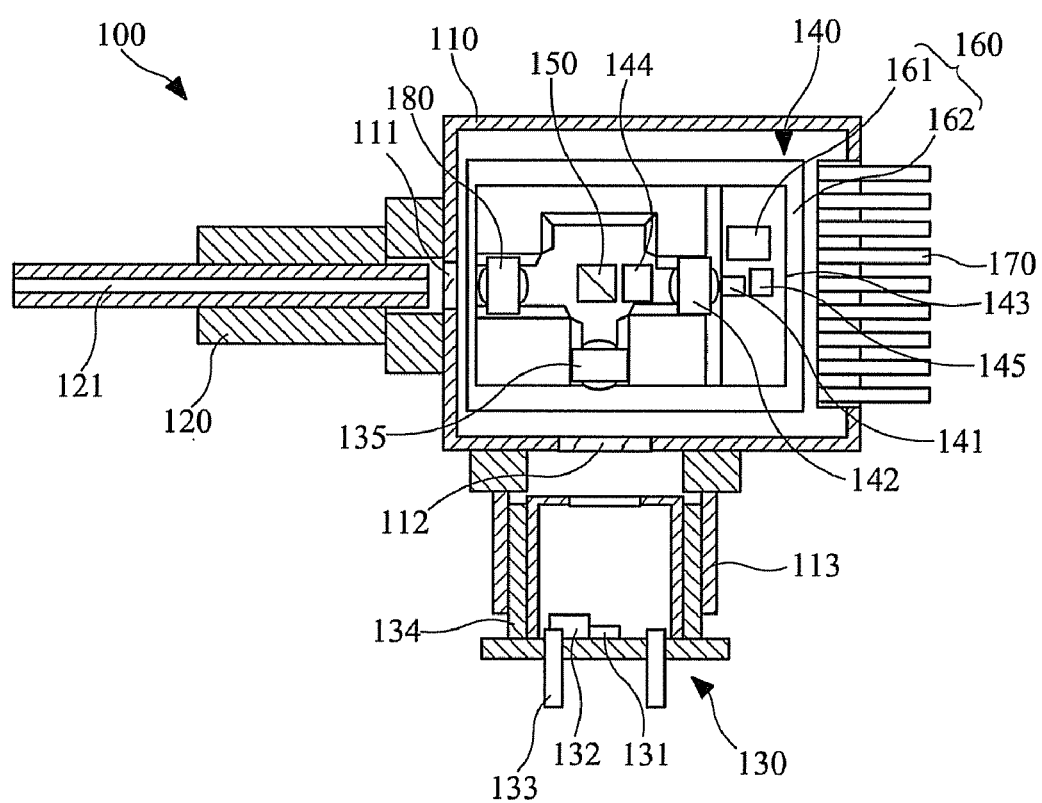
FIG. 2 is a cross-sectional view of a bidirectional optical transceiver module according to an exemplary embodiment of the present invention.
Figure 3:
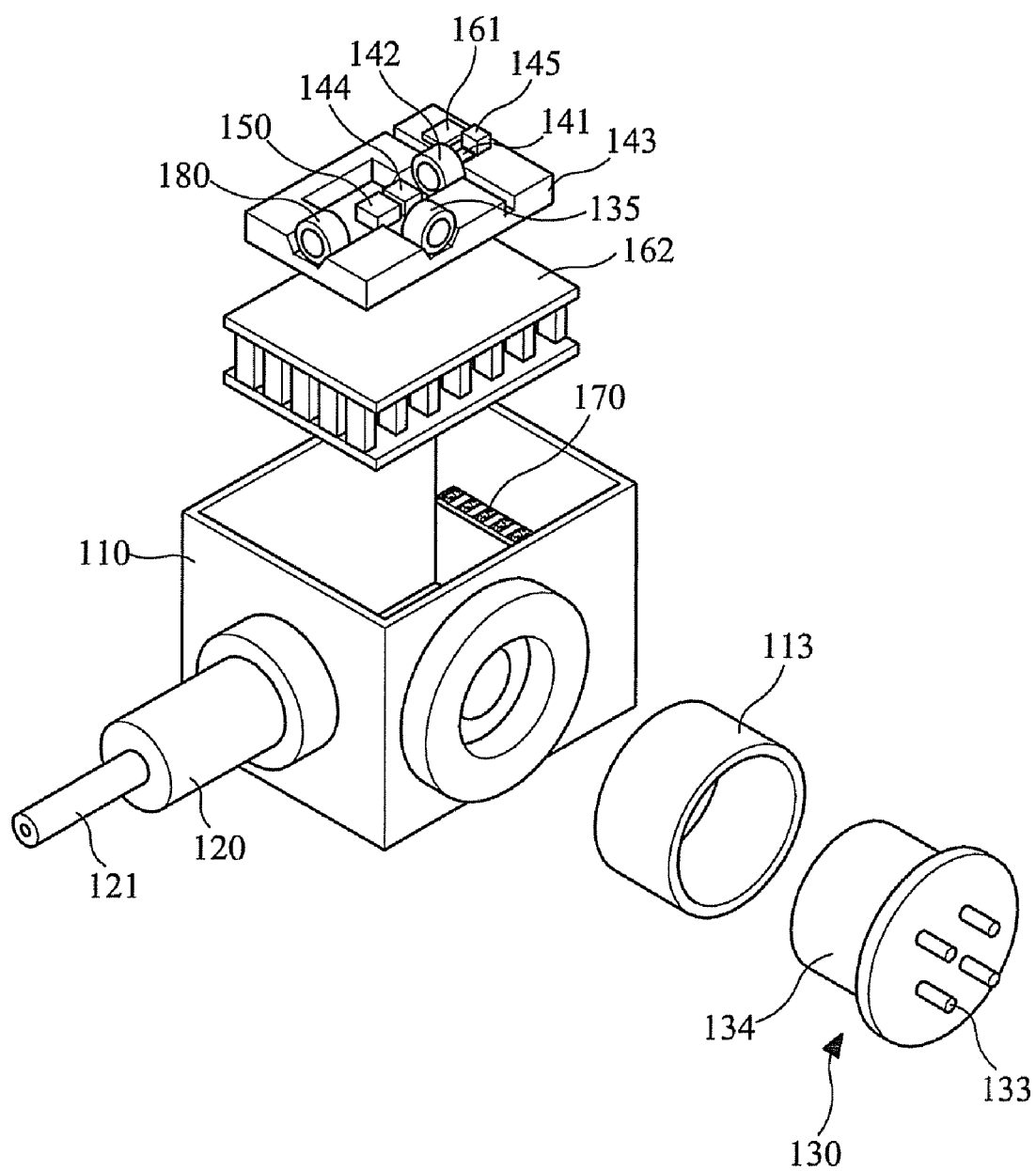
FIG. 3 is an exploded perspective view of the bidirectional optical transceiver module shown in FIG. 2.
Figure 4:
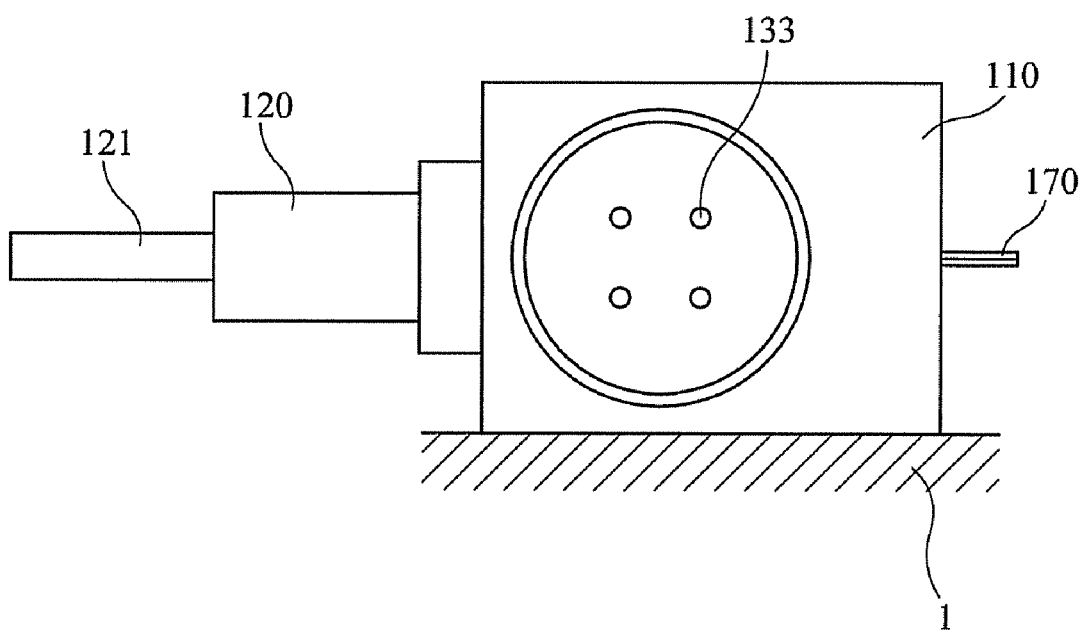
FIG. 4 is a side elevational view of the bidirectional optical transceiver module which is built in a heat sink.

FIG. 2 is a cross-sectional view of a bidirectional optical transceiver module according to an exemplary embodiment of the present invention; FIG. 3 is an exploded perspective view thereof; FIG. 4 is a side elevational view thereof with the bidirectional optical transceiver module built in a heat sink.

Referring to FIGS. 2 to 4, a bidirectional optical transceiver module 100 includes a package 110, a ferrule 120, an optical receiver module 130, a sub-optical transmitter module 140, an optical filter 150 and a temperature regulator 160.

The package 110 has a flat bottom surface. For example, the package 110 may be shaped in a rectangular parallelepiped and have a space inside it. The ferrule 120 is fixed to one surface of the package 110. The ferrule 120 is configured so that an optical fiber 121 may be inserted into the ferrule 120.

For example, the ferrule 120 may be formed in a hollow, cylindrical configuration. The optical fiber 121 may be inserted into the ferrule 120 and supported the ferrule 120.

The optical receiver module 130 is fixed to another surface of the package 110. The optical receiver module 130 is fixed to the package 110 in a direction perpendicular to that of the ferrule 120 fixed to the package 110. For example, if the package 110 is formed in a rectangular parallelepiped, the optical receiver module 130 may be fixed to one of both sides of the surface of the package 110 to which the ferrule 120 is fixed.

The sub-optical transmitter module 140 is built in the package 110. The sub-optical transmitter module 140 includes a light-emitting element 141 and a collimating lens 142. The light-emitting element 141 acts to emit light. Examples of the light-emitting element 141 include a laser diode and a light-emitting diode. The collimating lens 142 is used to collimate light from the light-emitting element 141 and transmit it to the optical filter 150.

The optical filter 150 is built in the package 110. The optical filter 150 transmits light from the light-emitting element 141 to the optical fiber 121 and reflects light from the optical fiber 121 to the optical receiver module 130. That is, the optical filter 150 may separate the light from the light-emitting element 141 and the light from the optical fiber 121. Therefore, only with a single optical fiber 121, optical data may be simultaneously transmitted by the optical filter 150 in both directions. The optical filter 150 may have a coating layer with transmission and reflection capabilities depending on wavelengths. The optical filter 150 may be slanted at an angle of 45 degrees when the optical fiber 121 and the optical receiver module 130 are placed at right angles.

The temperature regulator 160 is built in the package 110 to maintain the sub-optical transmitter module 140 at a preset temperature. That is, the optical transceiver module 100 is designed such that the light emitting from the light-emitting element 141 is focused on the tip of the optical fiber 121. In this case, if the sub-optical transmitter module 140 is expanded due to heat of the light-emitting element 141 or contracted by temperatures of its surroundings, the focal point may vary, leading to an undesirable change in the amount of light focused on the optical fiber 121. Furthermore, the change in temperature may cause changes in the amount of light of and wavelength of the light-emitting element 141. Accordingly, the temperature regulator 160 is used to maintain the sub-optical transmitter module 140 at a preset temperature to thus prevent the above-mentioned problems due to the change in temperature.

As described above, since the sub-optical transmitter module 140 and the optical filter 150 are built in the package 110 and the optical receiver module 130 is externally fixed to the package 110, the existing housing and a holder to support the optical transmitter module on the housing may not be necessary, thereby saving the manufacturing cost of the package 110.

In addition, since the package 110 has a flat bottom surface, the package 110 may be securely fixed to the heat sink 1, thereby effectively discharging heat from the temperature regulator 160. Furthermore, since components except the existing housing cling to the package 110 which is fixed to the heat sink 1, the optical transceiver module 100 may be more endurable to external impact or vibration.

The package 110 may have first and second windows 111 and 112. The first window 111 allows light to be transmitted to and from the package 110 through the optical fiber 121. The first window 111 is formed on the package 110 to correspond to the tip of the optical fiber 121. The second window 112 allows light to be transmitted to the optical receiver module 130. The second window 112 is formed on the package 110 to correspond to a light-receiving element 131.

The first and second windows 111 and 112 may be sealed with transparent plates to keep the package 110 airtight. The transparent plate may be made of transparent material such as sapphire. The transparent plate may be used to seal the first and second windows 111 and 112, for example, by glass soldering. A feed through 170 may be fixed to the package 110. The feed through 170 is used to supply power to and connect a signal line to the sub-optical transmitter module 140 and the optical receiver module 130.

The temperature regulator 160 includes a thermistor 161 and a thermoelectric element 162. The thermistor 161 is used to measure temperature of the sub-optical transmitter module 140, for example, of the light-emitting element 141. If data on the temperature measured by the thermistor 161 is provided to an external controller, the external controller controls the operation of the thermoelectric element 162 based on the temperature data.

The thermoelectric element 162 may be controlled to absorb heat when the sub-optical transmitter module 140 has a higher temperature than a preset temperature and to evolve heat when the sub-optical transmitter module 140 has a lower temperature than the preset temperature. The thermoelectric element 162 may absorb or evolve heat using Peltier effect which is a thermodynamic effect which occurs when current is passed through a thermocouple. The thermoelectric element 162 may be controlled to absorb or evolve heat according to the direction of current, and control the amount of heat absorbed or evolved according to the amount of current.

The sub-optical transmitter module 140 may further include a substrate 143 where the light-emitting element 141, the optical filter 150 and the collimating lens 142 are mounted. The substrate 143 may be a silicon optical bench, for example. The silicon optical bench facilitates mounting of the light-emitting element 141, the optical filter 150 and the collimating lens 142 as well as a thermistor 161, an optical fiber focusing lens 180, an optical receiver module focusing lens 135 and an isolator 144.

The thermistor 161 of the temperature regulator 160 may be mounted on the substrate 143. The thermoelectric element 162 of the temperature regulator 160 is provided below the substrate 143. Accordingly, the temperature regulator 160 may absorb heat transmitted from the light-emitting element 141 to the substrate 143 or evolve heat to the substrate 143 to stabilize temperature of the components mounted on the substrate 143. Furthermore, the thermoelectric element 162 may securely support the substrate 143 and discharge heat absorbed from the substrate 143 outside the package 110.

On the substrate 143, the optical fiber focusing lens 180 may be mounted. The optical fiber focusing lens 180 acts to focus light passing through the optical filter 150 and transmit it to the optical fiber 121. On the substrate 143, the optical receiver module focusing lens 135 may be mounted. The optical receiver module focusing lens 135 acts to focus light reflected by the optical filter 150 and transmit it to the optical receiver module 130. Since the optical receiver module focusing lens 135 is mounted on the substrate 143 in the package 110, the optical receiver module 130 may weigh less compared to when an optical receiver module is equipped with the optical receiver module focusing lens 135. Therefore, when the optical receiver module 130 is coupled to the package 110, the coupled portion may be more endurable to external impact or vibration.

The sub-optical transmitter module 140 may further include an isolator 144. The isolator 144 is used to reduce reflective light which is externally input. Further, the sub-optical transmitter module 140 may further include a monitoring element 145. The monitoring element 145 is used to control light which is output from the light-emitting element 141. The monitoring element 145 provides a detected optical output value to an external controller. The external controller may control the optical output of the light-emitting element 141 based on the optical output value. The monitoring element 145 may be a monitoring photodiode, for example.

The optical receiver module 130 may include a light-receiving element 131, a pre-amplifier 132, a receiver lead 133, and a can 134. The light-receiving element 131 receives light which is focused through the optical receiver module focusing lens 135. The light-receiving element 131 may be a photodiode. The pre-amplifier 132 amplifies minute current produced by the light-receiving element 131. The receiver lead 133 transmits a signal amplified by the pre-amplifier 132 to an external circuit. The can 134 allows the light-receiving element 131, the pre-amplifier 132 and the receiver lead 133 to be mounted therein. Furthermore, the can 134 may protect the light-receiving element 131, the pre-amplifier 132 and the receiver lead 133 from the outside. The can 134 has an opening which corresponds to the second window 112 so that light may be transmitted to the light-receiving element 131 through the second window 112.

The light-receiving module 130 may be coupled to the package 110 by means of a sleeve 113. The sleeve 113 is fixed, for example, by welding to a protrusion which is formed to surround the second window 112 of the package 110. A part of the can 134 is inserted and fixed to the sleeve 113 so that the optical receiver module 130 may be coupled to the package 110. If a part of the can 134 is inserted and fixed to the sleeve 113, the can 134 and the sleeve 113 may overlap each other that much and thus the optical receiver module 130 may be more securely fixed to the sleeve 113.

Figure 5:
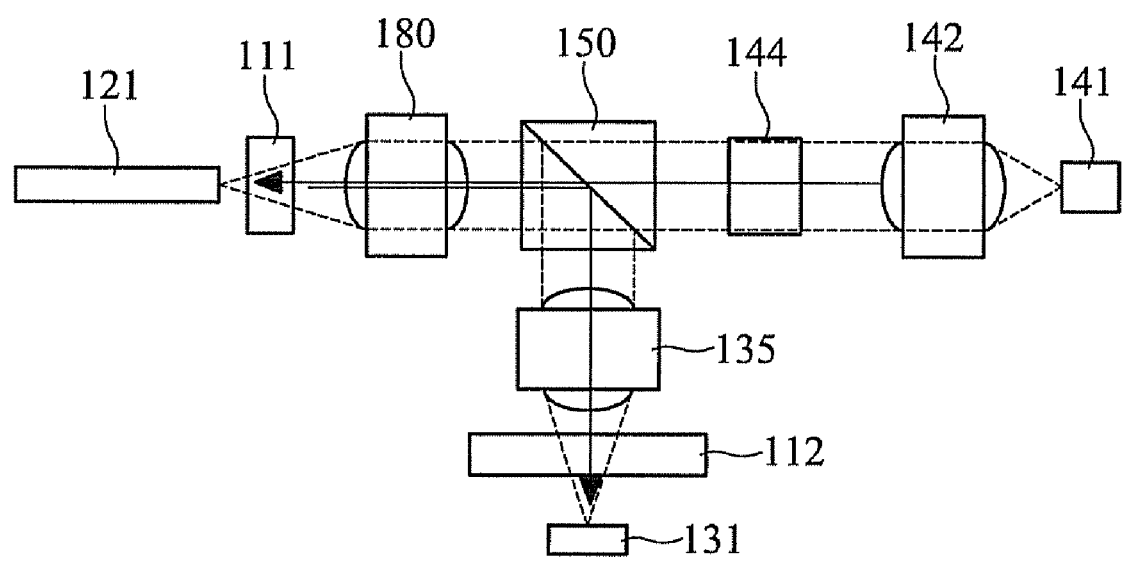
FIG. 5 is a schematic diagram illustrating a bidirectional optical transmission and reception process in FIG. 2.

A bidirectional optical transmission process by the bidirectional optical transceiver module 100 thus configured will be described with reference to FIG. 5.

In case of transmitting a signal through the optical fiber 121, light from the light-emitting element 141 is collimated by the collimating lens 142 and is incident on the optical filter 150 through the isolator 144. The light with a wavelength passing through the optical filter 150 is transmitted through the optical filter 150. The light is focused by the optical fiber focusing lens 180 and is transmitted to the optical fiber 121 through the first window 111.

In case of receiving a signal through the optical fiber 121, light received through the optical fiber 121 passes through the first window 111 and the optical fiber focusing lens 180 and is incident on the optical filter 150. The light with a wavelength reflected by the optical filter 150 is reflected by the optical filter 150 and is transmitted to the optical receiver module focusing lens 135. The light is focused by the optical receiver module focusing lens 135 and is transmitted to the light-receiving element 131 through the second window 112.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bidirectional optical transceiver module comprising:
   a package configured to have a flat bottom surface and include two windows used for optical transmission and reception;
   a ferrule configured to be coupled to one side of the package and allow an optical fiber to be inserted therein;
   an optical receiver module configured to be coupled to another side of he package in a direction perpendicular to that of the ferrule coupled to the package;
   a sub-optical transmitter module configured to be built in the package and include a light-emitting element and a collimating lens used to collimate light from the light-emitting element;
   an optical filter configured to be built in the package, transmit light from the light-emitting element to the optical fiber and reflect light received through the optical fiber to the optical receiver module; and
   a temperature regulator configured to be built in the package and control the sub-optical transmitter module to a preset temperature,
   wherein the sub-optical transmitter module comprises a substrate to mount the light-emitting element, the optical filter and the collimating lens thereon.

2. The bidirectional optical transceiver module of claim 1, wherein an optical fiber focusing lens which focuses light passing through the optical filter and transmits the focused light to the optical fiber is mounted on the substrate.

3. The bidirectional optical transceiver module of claim 2, wherein an optical receiver module focusing lens which focuses light reflected by the optical filter and transmits the focused light to the optical receiver module is mounted on the substrate.

4. The bidirectional optical transceiver module of claim 3, wherein the optical receiver module comprises a light-receiving element for receiving light which is focused through the optical receiver module focusing lens, a pre-amplifier for amplifying current produced by the light-receiving element, a receiver lead for transmitting a signal amplified by the pre-amplifier to an external circuit, and a can for allowing the light-receiving element, the pre-amplifier and the receiver lead to be mounted therein.

5. The bidirectional optical transceiver module of claim 4, wherein the optical receiver module is configured to be coupled to the package in such a manner that the can is inserted and fixed to a sleeve fixed to the package.

6. The bidirectional optical transceiver module of claim 4, wherein the light-receiving element is a photodiode.

7. The bidirectional optical transceiver module of claim 1, wherein the temperature regulator comprises a thermistor used to measure temperature of the sub-optical transmitter module and a thermoelectric element controlled to absorb heat when the sub-optical transmitter module has a higher temperature than a preset temperature and to evolve heat when the sub-optical transmitter module has a lower temperature than the preset temperature.

8. The bidirectional optical transceiver module of claim 7, wherein the thermistor is mounted on the substrate and the thermoelectric element is provided below the substrate.

9. The bidirectional optical transceiver module of claim 1, wherein the substrate is a silicon optical bench.

10. A bidirectional optical transceiver module comprising:
    a package configured to have a flat bottom surface and include two windows used for optical transmission and reception;
    a ferrule configured to be coupled to one side of the package and allow an optical fiber to be inserted therein;

an optical receiver module configured to be coupled to another side of the package in a direction perpendicular to that of the ferrule coupled to the package;

a sub-optical transmitter module configured to be built in the package and include a light-emitting element and a collimating lens used to collimate light from the light-emitting element;

an optical filter configured to be built in the package, transmit light from the light-emitting element to the optical fiber and reflect light received through the optical fiber to the optical receiver module; and a temperature regulator configured to be built in the package and control the sub-optical transmitter module to a preset temperature wherein a feed through is coupled to the package to supply power to and connect a signal line to the sub-optical transmitter module and the optical receiver module.

11. The bidirectional optical transceiver module of claim 10, wherein the sub-optical transmitter module further comprises an isolator to reduce reflective light which is externally input.

12. The bidirectional optical transceiver module of claim 10, wherein the sub-optical transmitter module further comprises a monitoring element to control light which is output from the light-emitting element.

13. The bidirectional optical transceiver module of claim 10, wherein the light-emitting element is a laser diode and the monitoring element is a monitoring photodiode.

* * * * *